Figure 1:
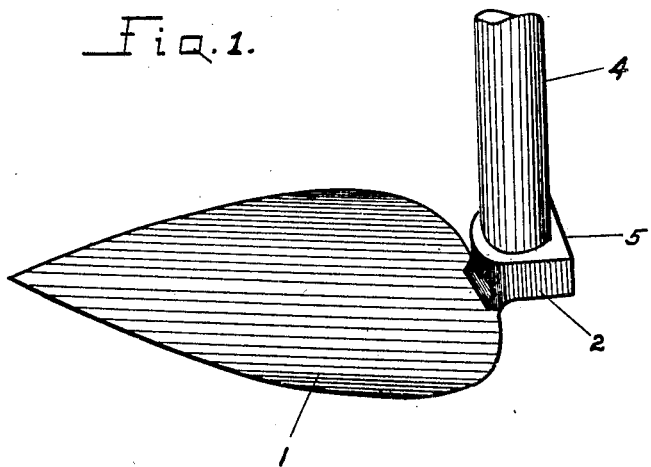

G. F. A. SORDI.
HOE.
APPLICATION FILED MAY 22, 1908.

926,220.

Patented June 29, 1909.

Witnesses

Inventor
Giovanni F. A. Sordi.

Attorney

UNITED STATES PATENT OFFICE.

GIOVANNI F. A. SORDI, OF STOCKTON, CALIFORNIA.

HOE.

No. 926,220.  Specification of Letters Patent.  Patented June 29, 1909.

Application filed May 22, 1908. Serial No. 434,282.

*To all whom it may concern:*

Be it known that I, GIOVANNI F. A. SORDI, a citizen of the United States, residing at Stockton, in the county of San Joaquin and State of California, have invented certain new and useful Improvements in Hoes; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in garden and farm implements and particularly to hoes of all classes, the object of the invention being to produce a hoe having a handle eye of uniform dimensions and not tapered as is now the case, since in the present ones having tapered eyes the end of the handle must also be turned on a taper to fit the same, which causes a waste of material and makes it necessary to keep hammering the handle to make it stay on thereby splintering and splitting the same and making it useless.

Another object of the invention is to produce a hoe which can also be used as a stake driver or for other purposes as in a vineyard or similar place in which the implement may be in use; also to produce a simple, inexpensive and effective tool for the purpose.

These objects I accomplish by means of a tool having a handle eye of uniform dimensions from end to end and having its back or rear side squared; also by such other and further construction and relative arrangement of parts as will more fully appear by a perusal of the following specification and claim.

In the drawings similar characters of reference indicate corresponding parts in both views.

Figure 2:
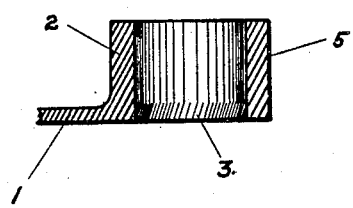

Figure 1, is a perspective view of a hoe provided with the subject matter of the present invention, and Fig. 2, is a central vertical section of Fig. 1 showing the body proper of the hoe broken away, and omitting the handle.

Referring now more particularly to the characters of reference on the drawings 1 designates the body of the hoe proper the same having a handle eye 2 of uniform dimensions from end to end and having a serrated edge 3 around the inside of said eye at the outer end thereof to form a grip for the handle 4 when inserted, the said handle 4 being of uniform dimensions from end to end thereby not presenting any enlarged end to be split and broken as is commonly done with the present used handles after having been in use. The rear or back of the eye 2 is squared as at 5 to form a hammer for driving stakes, etc. when using the hoe, thus doing away with the necessity of having a separate tool for the purpose.

This construction just described can be applied of course to any kind of hoe hence I do not desire to be understood as limiting myself to the forms of hoes shown in the drawings.

While this specification sets forth in detail the present and preferred construction of my device, still in practice small deviations therefrom might be resorted to without departing from the spirit of the invention.

Having thus described my invention what I claim as new and useful and desire to secure by Letters Patent is:—

A device of the type set forth composed of a blade portion and an integral eye, said eye being formed with a bore of equal diameter throughout its length, and a row of serrations arranged at the outer end of the eye, said serrations being of comparatively slight length and being arranged at acute angles to the longitudinal axis of the bore, the bore of said eye being smooth from the inner end of said row of serrations to the inner end of said eye.

In testimony whereof I affix my signature in presence of two witnesses.

GIOVANNI F. A. SORDI.

Witnesses:
 PERCY S. WEBSTER,
 FRANK H. CARTER.